(12) United States Patent
Yi

(10) Patent No.: US 7,433,467 B2
(45) Date of Patent: Oct. 7, 2008

(54) PORTABLE WIRELESS TERMINAL WITH GROUND CONNECTING DEVICE WHICH USES A HINGE DEVICE

(75) Inventor: Young-Jin Yi, Seoul (KR)

(73) Assignee: Samsung Electronics Co., Ltd (KR)

( * ) Notice: Subject to any disclaimer, the term of this patent is extended or adjusted under 35 U.S.C. 154(b) by 644 days.

(21) Appl. No.: 10/752,387

(22) Filed: Jan. 6, 2004

(65) Prior Publication Data

US 2004/0142735 A1 Jul. 22, 2004

(30) Foreign Application Priority Data

Jan. 6, 2003 (KR) .................... 10-2003-0000584

(51) Int. Cl.
*H04M 9/00* (2006.01)
*H04M 1/00* (2006.01)
(52) U.S. Cl. .............................. 379/433.13; 455/575.3
(58) Field of Classification Search ......... 379/433–434, 379/428, 430; 439/165, 607, 76.1, 31; 16/303
See application file for complete search history.

(56) References Cited

U.S. PATENT DOCUMENTS

| | | | | |
|---|---|---|---|---|
| 5,001,659 A | * | 3/1991 | Watabe | 361/681 |
| 5,173,837 A | * | 12/1992 | Blackwell et al. | 361/681 |
| 5,608,604 A | * | 3/1997 | Francis | 361/681 |
| 5,615,259 A | * | 3/1997 | Gilbert | 379/433.13 |
| 5,628,089 A | * | 5/1997 | Wilcox et al. | 16/303 |
| 5,697,124 A | * | 12/1997 | Jung | 16/341 |
| 6,083,010 A | * | 7/2000 | Daoud | 439/31 |
| 6,134,121 A | * | 10/2000 | Braxton | 361/818 |
| 6,266,019 B1 | * | 7/2001 | Stewart | |
| 6,272,356 B1 | * | 8/2001 | Dolman et al. | 455/575.3 |
| 6,292,980 B1 | | 9/2001 | Yi et al. | |
| 6,350,155 B1 | * | 2/2002 | Mullinger-Bausch et al. | |
| 6,808,402 B2 | * | 10/2004 | Ryu et al. | 439/165 |
| 6,963,766 B2 | * | 11/2005 | Jung | 455/575.3 |
| 6,980,424 B2 | * | 12/2005 | Kim et al. | 361/683 |
| 7,124,472 B2 | * | 10/2006 | Duan et al. | 16/303 |
| 2006/0160582 A1 | * | 7/2006 | Jeun et al. | 455/575.1 |

\* cited by examiner

*Primary Examiner*—Curtis Kuntz
*Assistant Examiner*—Phylesha L Dabney
(74) *Attorney, Agent, or Firm*—The Farrell Law Firm, PC

(57) ABSTRACT

A mobile communication terminal having a main body and a folder pivotably connected to the main body, each having internal surfaces provided with a ground coated with conductive material; a hinge device including a conductive hinge housing received in the folder and connected to the grounds, a conductive coil spring received in the hinge housing and supported at one end of the hinge housing against an inner wall of one end of the hinge housing, and a conductive contact pin supported at one end against the other end of the coil spring and protruding through the other end of the hinge housing to be connected to the main body; and a conductive hinge dummy mounted within the main body and connected to the ground and the other end of the contact pin. Thus, operational characteristics of the terminal are improved and electromagnetic wave absorptance is reduced.

8 Claims, 5 Drawing Sheets

PORTABLE WIRELESS TERMINAL WITH GROUND CONNECTING DEVICE WHICH USES A HINGE DEVICE

PRIORITY

This application claims priority to an application entitled "Portable Wireless Terminal with Ground Connecting Device Using Hinge Device" filed in the Korean Industrial Property Office on Jan. 6, 2003 and assigned Serial No. 2003-0584, the contents of which are hereby incorporated by reference.

BACKGROUND OF THE INVENTION

1. Field of the Invention

The present invention relates to a portable wireless terminal, and more particularly to a folder type terminal, in which grounds formed in a main body and in a folder are electrically connected to each other, so that an amount of electromagnetic wave absorptance to which a user is exposed can be reduced.

2. Description of the Related Art

In general, portable wireless terminals can be divided into three types according to external form: bar type terminals, flip type terminals, and folder type terminals.

The bar type terminal has a data input/output means and a transmitter/receiver module mounted in one main housing. In the bar type terminal, mistaken operation can occur because a keypad as data input means is always exposed to the outside. Also, its miniaturization is limited because a minimum distance must be maintained between the transmitter part and the receiver part.

The flip type terminal is comprised of a main body, a flip, and a hinge device connecting the flip to the main body. An input/output means and a transmitter/receiver module are mounted in the main body. In the flip type terminal, mistaken operation as in the bar type terminal may be prevented because the flip covers a keypad as data input means. However, the flip type terminal has the same limitation on its miniaturization as described above for the bar type terminal, and for similar reasons.

The folder type terminal comprises a main body, a folder, and a hinge device pivotably connecting the folder to the main body. The folder is opened and shut by a pivot movement of the folder. When the folder is in close contact with the main body, that is, in a stand-by mode, the folder covers a keypad, and thus mistaken operation as described with reference to the bar type terminal can be prevented. Further, a folder type terminal can be miniaturized more than a bar type or flip type terminal and still maintain a sufficient distance between the transmitter part and the receiver part in a call mode.

FIG. 1 is a perspective view of a conventional portable wireless terminal, in particular, a conventional folder type terminal 100.

As shown in FIG. 1, the conventional folder type terminal comprises a main body 110 and a folder 150 which is connected to the main body 110 in such a manner that it can be opened and shut by being pivoted on the hinge device (not shown).

In the main body 110, a keypad 113 and a transmitter part 115 are provided on the housing 111, and a side hinge arm 117 is disposed on each of both upper sides of the housing 111.

In the folder 150, a display device 153 is exposed on a housing 151, and a receiver part 155 is provided in an upper portion of the housing 151. A center hinge arm 157, which is interposed between the side hinge arms 117 of the main body housing 110, is also disposed in a lower portion of the folder housing 151 to pivotably connect the folder 150 to the main body 110. The designated hinge device is installed in the center hinge arm 157.

The conventional hinge device of FIG. 1 is disclosed in U.S. Pat. No. 6,292,980 which is commonly assigned to the assignee of the present invention. The disclosed hinge device has a hinge cam and a hinge shaft which are formed with a mountain-shaped portion and a valley-shaped portion, respectively, and a coil spring which brings the hinge cam in close contact with the hinge shaft. Because the hinge device accommodates the hinge cam, the hinge shaft and the coil spring in a hinge housing, curved surfaces of the mountain-shaped portion and the valley-shaped portion and a resilient force of the coil spring maintain connection during the opening and closing of the folder or the flip.

Many countries of the world are tightening control over electromagnetic wave emissions in accordance with published study results showing that electromagnetic waves may be harmful to the human body.

Measures to reduce electromagnetic wave emissions of portable wireless terminals are limited, in practice, to attaching an electromagnetic wave absorber to an antenna or an antenna part to which electric current is supplied, or changing a ground pattern formed inside an injection molding material of the terminal to either shift a position in which the electromagnetic are concentrated or compensate for the concentrated electromagnetic waves. Moreover, such measures may be available for reducing an electromagnetic wave absorptance of a human body, but they give rise to a disadvantageous lowering of the radiation characteristics of an antenna. In order to simultaneously respect the electromagnetic wave absorptance limitation of the human body and maintain the radiation characteristics of an antenna, a position of an electromagnetic wave absorber or a ground pattern must be changed only by repeated tests and verifications. There is another problem in that use of metallic components in the hinge device of a folder type terminal degrades the operational characteristics of the terminal, such as the radiation characteristics of an antenna.

SUMMARY OF THE INVENTION

Accordingly, the present invention has been made to solve the above-mentioned problems occurring in the prior art, and an object of the present invention is to provide a potable wireless terminal capable of reducing an electromagnetic wave absorptance.

Another object of the present invention is to provide a portable wireless terminal which can maintain excellent radiation characteristics of an antenna while reducing the amount of electromagnetic wave absorptance to which a user is exposed.

In order to accomplish these objects, the present invention provides a mobile communication terminal having a main body and a folder, the folder being pivotably connected to the main body, the main body and the folder each having a ground coated with a conductive material on its inner surface. The mobile communication terminal comprises a hinge device and a conductive hinge dummy coupled to the ground for being mounted in the main body, said conductive hinge dummy being fixedly connectable to the other end of the contact pin, said hinge device comprising a conductive hinge housing coupled to the ground, said conductive hinge housing adapted to be mounted within the folder; a conductive coil spring adapted to be mounted within the hinge housing, one end of said conductive coil spring being fixed at to an inner wall at one end of said conductive hinge housing; and a conductive contact pin adapted to be mounted within the hinge housing, one end of said conductive contact pin being supported by the opposite end of the coil spring, said conductive contact pin having a protrusion extending through an other end of said hinge housing for connection to the main body.

In accordance with another aspect of the present invention, there is provided a mobile communication terminal having a main body and a folder pivotably connected to the main body, the mobile communication terminal comprising: a main body housing formed with a ground, whose internal surface is coated with a conductive material, and provided, on both upper sides thereof, with a side hinge arm; a folder housing formed with a ground, whose internal surface is coated with a conductive material, and provided at a lower end thereof with a center hinge arm which is pivotably connected between the side hinge arms; a connecting piece of a conductive material fixed to the internal surface of the folder housing, connected to the ground of the folder housing and extending into an inner portion of the center hinge arm; a hinge dummy of conductive material fixed to the side hinge arms of the main body housing and connected to the ground of the main body housing; and a hinge device mounted within the center hinge arm to pivotably connect the folder to the main body, wherein the hinge device comprises a hinge housing of a conductive material mounted within the center hinge arm and coming in contact with the contact piece, a coil spring of conductive material received in the hinge housing and supported at one end thereof against an inner wall of one end of the hinge housing, and a contact pin of conductive material mounted within the hinge housing, supported against the other end of the coil spring and protruding through the other end of the hinge housing to be connected to the main body, so that the contact pin and the hinge dummy are electrically connected to each other.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
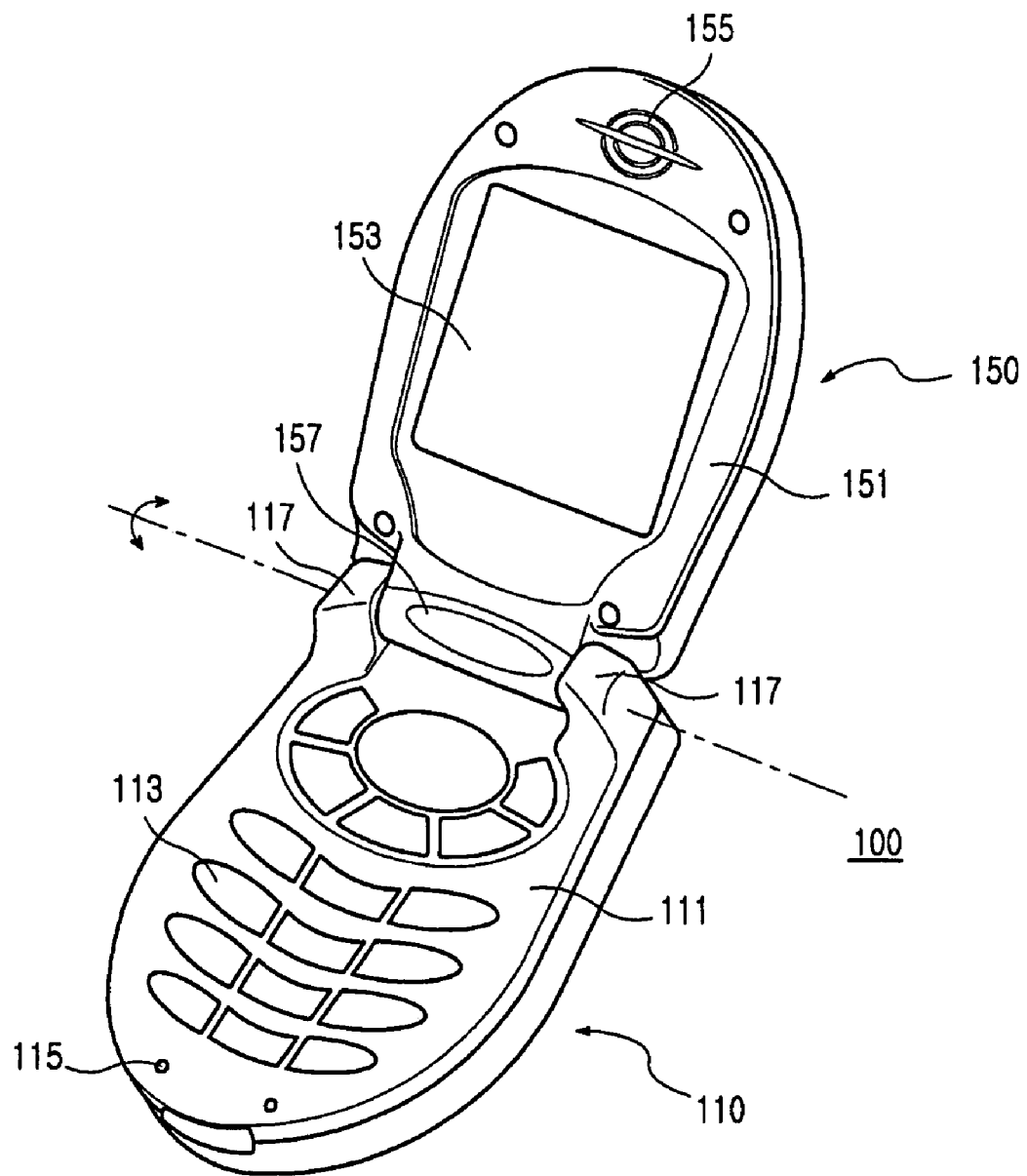
FIG. 1 is a perspective view of a conventional portable wireless terminal.

Preferred embodiments of the present invention will be described below in detail with reference to the accompanying drawings. Identical or similar components in drawings are designated by the same reference numerals as far as possible although they are shown in different drawings. In the following description of the present invention, a detailed description of known functions and configurations incorporated herein is omitted when it may make the subject matter of the present invention unclear.

Figure 2:
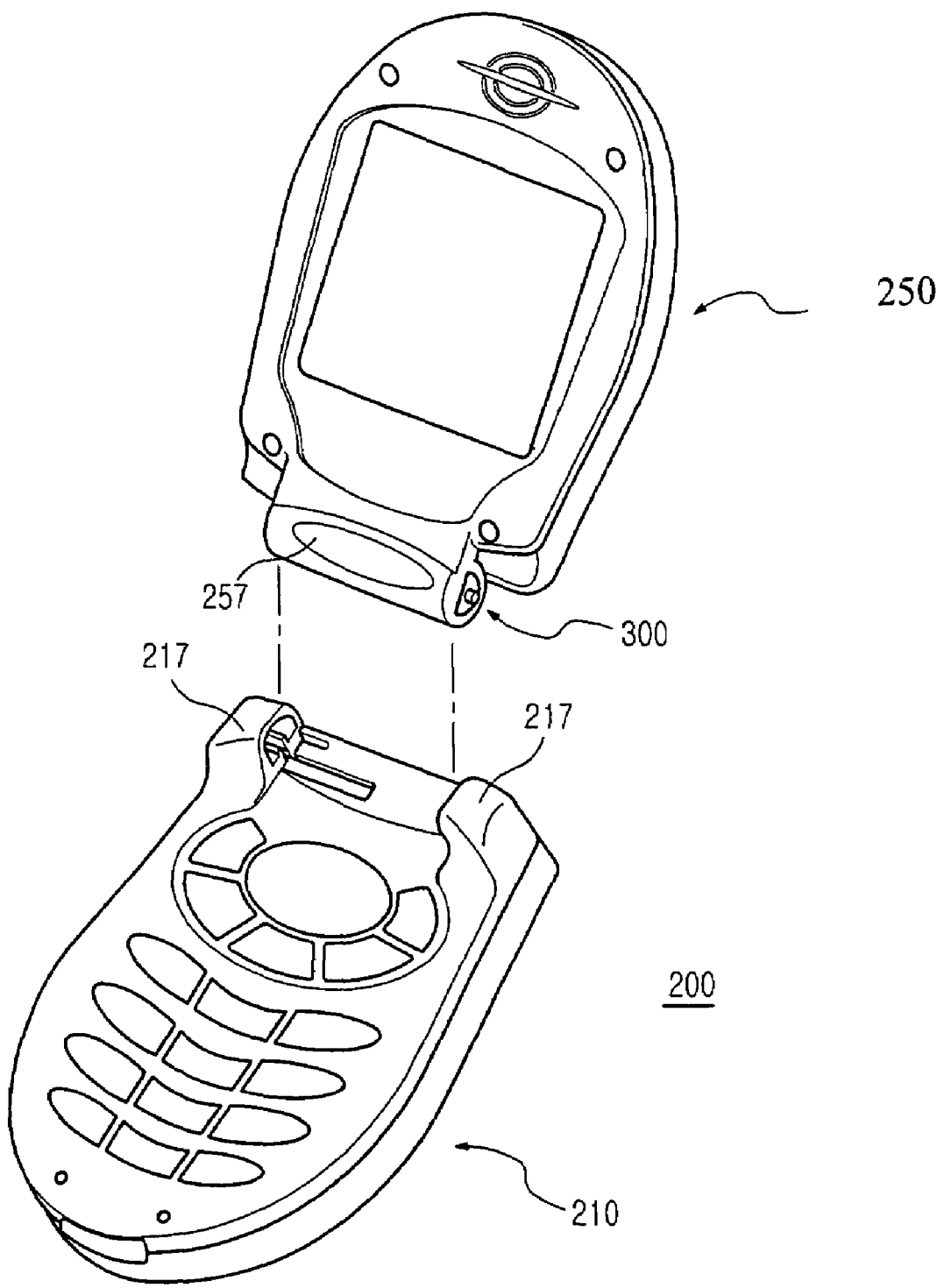
FIG. 2 is an exploded perspective view of a portable wireless terminal with a ground connecting device using a hinge device in accordance with one preferred embodiment of the present invention.
Figure 3:
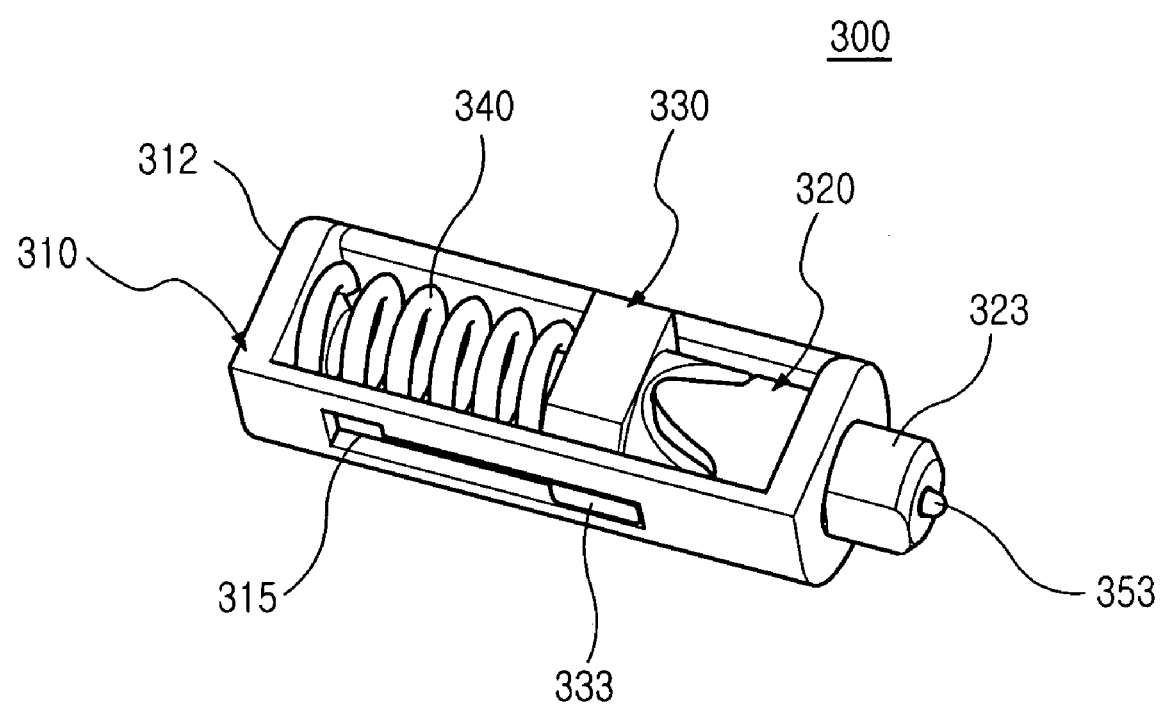
FIG. 3 is a perspective view of a hinge device of the portable wireless terminal shown in FIG. 2.

FIG. 2 shows an exploded perspective view of a portable wireless terminal 200 in accordance with a preferred embodiment, in which a main body 210 and a folder 250 of the portable wireless terminal 200 are separated from each other, and FIG. 3 shows an exploded perspective view of a hinge device 300 of the portable wireless terminal 200 in FIG. 2. In the portable wireless terminal 200, in accordance with the preferred embodiment of the present invention, grounds formed in the main body 210 and in the folder 250 are electrically connected to each other using the hinge device 330 which connects the folder 250 to the main body 210.

The hinge device 300 is constructed in such a manner that it is mounted within a center hinge arm 257 of the folder 250 and is connected to side hinge arms 217 of the main body 210.

Now, a description will be given for the hinge device 300 in conjunction with FIGS. 3 and 4.

Figure 4:
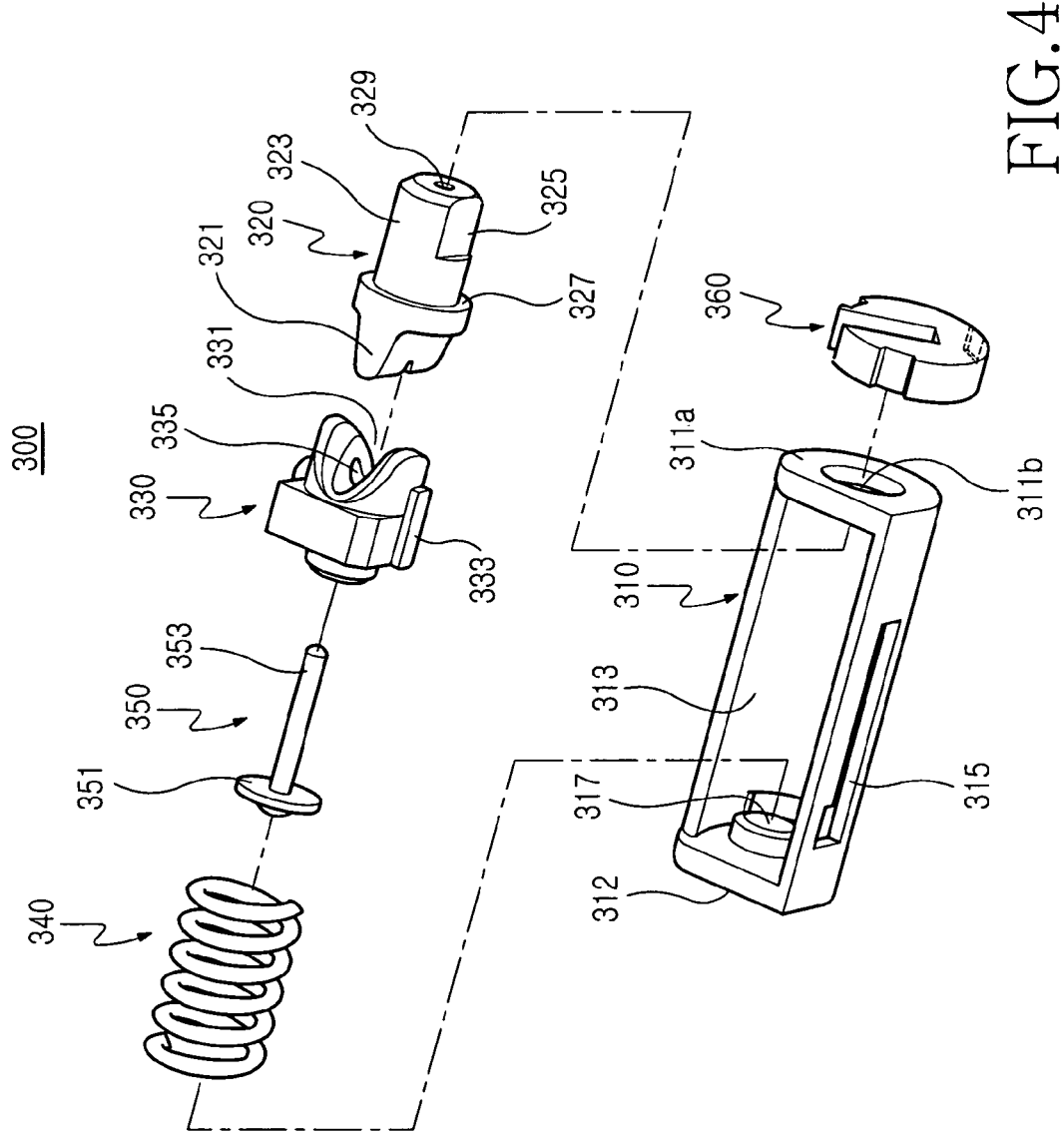
FIG. 4 is an exploded perspective view of the hinge device shown in FIG. 3.

FIG. 3 is a perspective view of the hinge device 300 of the portable wireless terminal 200 shown in FIG. 2, and FIG. 4 is an exploded perspective view of the hinge device 300 shown in FIG. 3.

As shown in FIGS. 3 and 4, the hinge device 300 has a hinge housing 310 in which a hinge shaft 320, a hinge cam 330, a coil spring 340 and a contact pin 350 are received. The hinge device 300 itself is received in the center hinge arm 257 of the folder 250 and is connected to the main body 210 by a hinge dummy 360 fixed to the main body 210.

One longitudinal end of the hinge housing 310 is formed as a closed end 312 and the other longitudinal end is formed as a partially opened end 311a having a shaft hole 311b. The hinge housing 310 includes a receiving chamber 313 with an open sidewall, and an inner wall of the hinge housing 310 with a longitudinally formed guide groove 315. The guide groove 315 can penetrate the side wall of the hinge housing 310 sodas to allow communication between the interior and exterior of the hinge housing 310. An inner wall of the closed end 312 of the hinge housing 310 is provided with a supporting protrusion 317 for supporting the coil spring.

The hinge shaft 320 has a mountain-shaped portion 321 with a curved surface at one end and a hinge protrusion 323 protruding outside of the opened end 311a of the hinge housing 310 through the shaft hole 311b at an other end. A stepped surface 327 is formed between the other end of the hinge shaft 320 and the hinge protrusion 323 and is supported against the inner wall of the hinge housing 310. The hinge shaft 320 revolves within the hinge housing 310 while firmly fixed to the main body 210 of the portable wireless terminal 200. That is, the hinge protrusion 323 protrudes out of the hinge housing 310 to be joined with the hinge dummy 360 which is in turn fixed to the main body 210. The hinge shaft 320 also has a through hole 329, which penetrates ends of the mountain-shaped portion 321 and the hinge protrusion 323 in a longitudinal direction of the hinge shaft 320. The hinge protrusion has on its outer circumferential surface a flat surface 325 for being foxed to the hinge dummy 360.

The hinge cam 330 has a valley-shaped portion 331, opposed to the mountain-shaped portion 321 of the hinge shaft 320, at its one end, and the valley-shaped portion 331 slidingly comes in contact with the mountain-shaped portion 321 when the hinge shaft 320 and the hinge cam 330 are received in the hinge housing 310. A guide protrusion 333, which is formed on an outer circumferential surface of the hinge cam 330, is engaged in the guide groove 315 and can linearly reciprocate within the hinge housing 310. The hinge cam 330 also has a longitudinal through hole 335. When the hinge shaft 320 and the hinge cam 330 are received in the hinge housing 310, the through holes 329 and 335, which are formed in the hinge shaft 320 and the hinge cam 330, respectively, are aligned in a straight line with each other and with the shaft hole 311b of the hinge housing 310.

The coil spring 340 is supported at its one end against the supporting protrusion 317, which is formed on the inner wall of the closed end 312 of the hinge housing 310, to provide a resilient force bringing the valley-shaped portion 331 of the hinge cam 330 and the mountain-shaped portion 321 of the hinge shaft 320 in close contact with each other.

The contact pin 350 comprises a supporting pedestal 340 against which the other end of the coil spring 340 is supported and a pin 353 which extends from the supporting pedestal 351 and protrudes toward the opened end of the hinge housing 310. The supporting pedestal 351 is interposed between the coil spring 340 and the hinge cam 330, and the pin 353 passes through the through holes 329, 335 of the hinge shaft 320 and the hinge cam 330 to protrude toward an end of the hinge protrusion 323 of the hinge shaft 320.

Meanwhile, although not shown, electronic circuit devices are contained within both the main body 210 and the folder 250 of the portable wireless terminal. For example, a main board in charge of communication functions, etc., of the terminal is contained within the main body 210, and an electronic circuit device connected to the display device and the receiver part, etc., is contained within the folder 250. Electromagnetic waves, which are generated from these electronic circuit devices during transmitting/receiving operations of the terminal, can not only bring about mistaken operations of the electronic circuits, but can also have an unhealthy influence on the human body.

In order to suppress the propagation of electromagnetic waves, conductive materials such as gold, silver and so on are coated on the inner surfaces of the housings of the main body 210 and the folder 250 to provide grounds to the electronic circuits.

With respect to this, the present invention provides a construction in which the hinge device 330 is grounded and, at the same time, the grounds formed in the main body 210 and the folder 250 are electrically connected to each other by the hinge device 300, thereby both reducing electromagnetic wave absorptance for a human body and maintaining the operational characteristics of the terminal.

Figure 5:
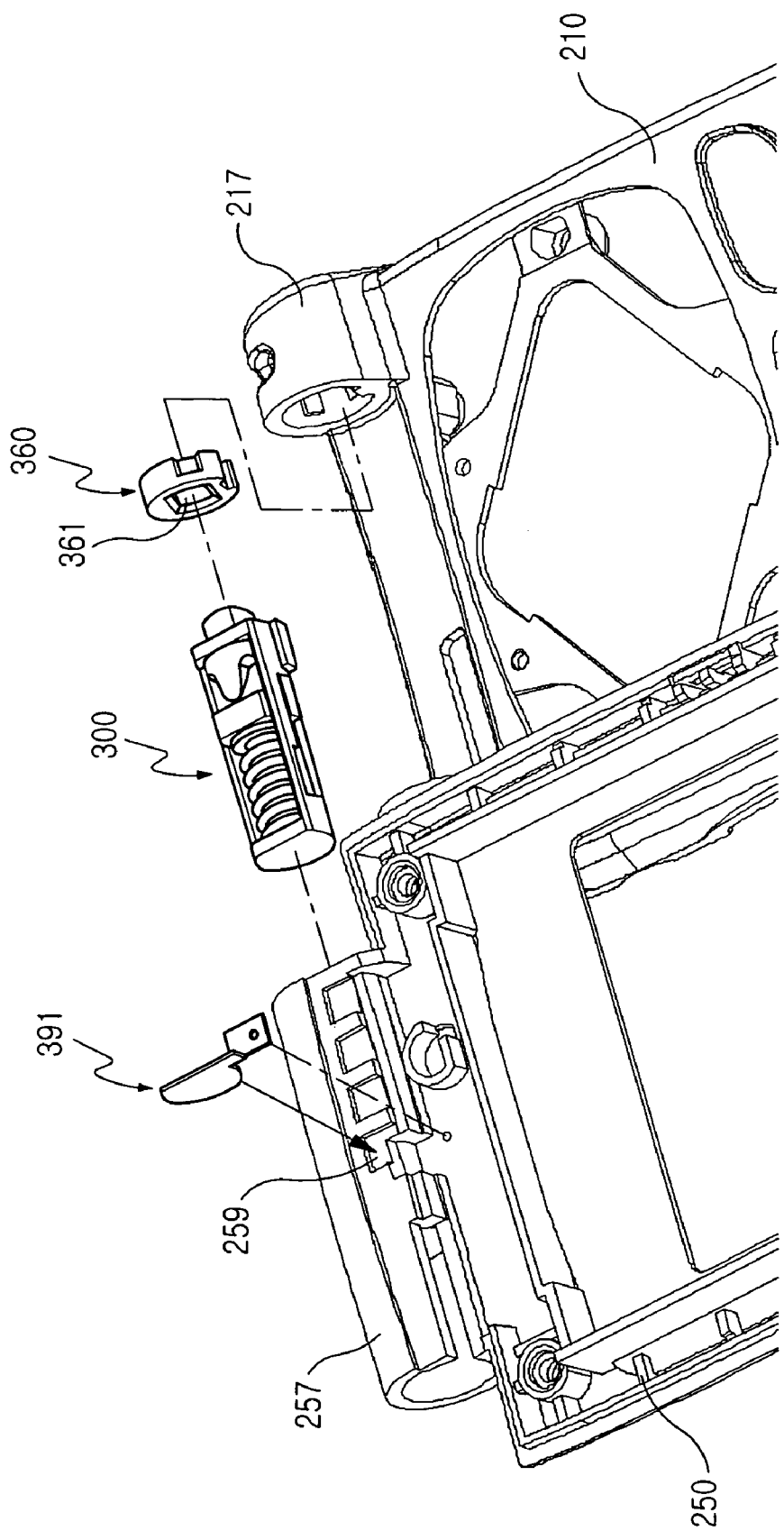
FIG. 5 is an exploded perspective view for explaining a construction in which the hinge device shown in FIG. 3 is used by the portable terminal.

Referring to FIG. 5, a description will be given below for the construction in which the grounds formed in the main body 210 and the folder 250 are electrically connected to each other by the hinge device 300.

As shown in FIG. 5, the hinge device 300 is joined with the hinge dummy 360, which is received in the center hinge arm 257 of the folder 250 and is fixed to the main body 210. Additionally, a connecting piece 391 fixed to the inner surface of the folder 250 extends to an inner side 259 of the center hinge arm 257 of the folder 250 thus being in contact with the hinge housing 310. The main body 210 and the folder 250 are provided on their inner surfaces with conductive materials to provide grounds. The connecting piece 391, the hinge housing 310, the coil spring 340, and the contact pin 350, all contained in the hinge device 300 as described above, as well as the hinge dummy 360 are also made of conductive materials. The hinge protrusion 323 of the hinge shaft 320 is joined with a dummy hole 361 of the hinge dummy 360, and the contact pin 350 protrudes toward the end of the hinge protrusion 323 thus being in contact with the hinge dummy 360.

Consequently, the hinge device 300 is grounded to the grounds of the main body 210 and the folder 250, and the grounds provided in the main body 210 and the folder 250 are connected to each other via the connecting piece 391, the hinge device 300 and the hinge dummy 360.

By connecting the grounds of the main body and folder to each other via the hinge device as stated above, the electromagnetic wave absorptance is considerably reduced. Furthermore, the present invention contributes to lowering the cost of mobile terminals because it permits connection of the folder to the main body without the repetitive test processes using electromagnetic wave absorbers and change of ground patterns which have been necessary in the prior art. In addition, though a conventional metallic hinge device may influence communication characteristics of a terminal or radiation characteristics of an antenna, because the present invention connects the grounds of the main body and the folder to each other using the conductive materials of the connecting piece and the hinge dummy, and because the hinge device itself is grounded, both the operational characteristics of the terminal and the electromagnetic wave absorptance can be improved.

While the invention has been shown and described with reference to certain preferred embodiments thereof, it will be understood by those skilled in the art that various changes in form and details may be made therein without departing from the spirit and scope of the invention. Accordingly, the scope of the invention should not be limited to the embodiments, but should be defined by the appended claims and equivalents thereof.

What is claimed is:

1. A mobile communication terminal having a main body and a folder, the folder being pivotably connected to the main body, the main body and the folder each having a ground coated with a conductive material on its inner surface, said mobile communication terminal comprising:
    a hinge device for electrically connecting the main body and the folder, the hinge device comprising:
        a conductive hinge housing electrically connected to the ground of the folder, said hinge housing adapted to be mounted within the folder;
        a conductive coil spring adapted to be mounted within the hinge housing, a first end of said coil spring being fixed to an inner wall of a first end of said hinge housing; and
        a conductive contact pin adapted to be mounted within the hinge housing, a first end of said contact pin being supported by a second end of the coil spring opposite the first end of the coil spring, a second end of the contact pin extending through a second end of said hinge housing for connection to the main body; and
    a conductive hinge dummy electrically connected to the ground of the main body and adapted to be mounted within the main body, said hinge dummy being fixed to the second end of the contact pin,
    wherein an electrical connection path between the main body and the folder through the hinge device includes the conductive coil spring and the conductive contact pin.

2. The mobile communication terminal according to claim 1, further comprising a conductive connecting piece fixed to the ground of the folder and in contact with the hinge housing which is mounted within the folder.

3. The mobile communication terminal according to claim 1, wherein the hinge dummy is provided with a dummy hole to which the second end of the contact pin is connected.

4. The mobile communication terminal according to claim 1, wherein the contact pin comprises a supporting pedestal which supports the second end of the coil spring at a first end of the supporting pedestal and a pin which extends from a second end of the supporting pedestal and protrudes outwardly through the second end of the hinge housing.

5. The mobile communication terminal according to claim 4, wherein the hinge device further comprises:
- a hinge shaft rotatably received in the hinge housing while supported against an inner wall of the second end of the hinge housing, having a longitudinal mountain-shaped portion at a first thereof, provided at a second end thereof with a hinge protrusion which protrudes outwardly through the second end of the hinge housing, and formed with a through hole which longitudinally penetrates the hinge shaft from the mountain-shaped portion to the hinge protrusion; and
- a hinge cam in contact with the supporting pedestal of the contact pin at a first end thereof, provided at a second end thereof with a valley-shaped portion corresponding to the mountain-shaped portion of the hinge shaft, moving longitudinally within the hinge housing and formed with a through hole which longitudinally penetrates the hinge cam so that the pin of the contact pin passes through the through holes of the hinge shaft and the hinge cam.

6. A mobile communication terminal having a main body and a folder pivotably connected to the main body, the mobile communication terminal comprising:
- a main body housing having a ground which has an internal surface coated with a conductive material, the main body housing having an upper end with two sides, wherein both sides are provided with a side binge arm;
- a folder housing having a ground which has an internal surface coated with a conductive material, the folder housing having a lower end with a center hinge arm, wherein the center hinge arm is pivotably connected between the side hinge arms;
- a conductive connecting piece fixed to the internal surface of the folder housing, connected to the ground of the folder housing, and extending into an inner portion of the center hinge arm;
- a conductive hinge dummy fixed to the side hinge arms of the main body housing and connected to the ground of the main body housing; and
- a hinge device received in the center hinge arm to pivotably and electrically connect the folder to the main body,
wherein the hinge device comprises:
- a conductive hinge housing mounted within the center hinge arm and in contact with the connecting piece;
- a conductive coil spring mounted within the hinge housing and supported at a first end thereof against an inner wall of a first end of the hinge housing; and
- a conductive contact pin received in the hinge housing having a supporting pedestal against which a second end of the coil spring is supported and a pin which extends from the supporting pedestal and protrudes out of a second end of the hinge housing in contact with the hinge dummy, so that the hinge device is grounded to the grounds of the main body and the folder, the grounds formed in the main body and the folder are electrically connected to each other, and an electrical connection path between the main body and the folder through the hinge device includes the conductive coil spring and the conductive contact pin.

7. The mobile communication terminal according to claim 6, wherein the hinge device further comprises:
- a hinge housing having a closed end and a partially opened end having a shaft hole, the hinge housing having a receiving chamber with a first side which is opened, the receiving chamber being provided on a side wall thereof with a longitudinal guide groove;
- a hinge shaft rotatably received in the hinge housing, having a longitudinal mountain-shaped portion at a first end thereof, provided at a second end thereof with a hinge protrusion which protrudes through the shaft hole of the hinge housing, and formed with a through hole which longitudinally penetrates the hinge shaft from the mountain-shaped portion to the hinge protrusion;
- a hinge cam provided at one end thereof with a valley-shaped portion corresponding to the mountain-shaped portion of the hinge shaft, having on one side thereof a guide protrusion which moves longitudinally within the guide groove of the hinge housing, the hinge cam having a through hole which longitudinally penetrates the hinge cam;
- a coil spring with a first end which is supported against an inner wall on the closed end of the hinge housing for urging the mountain-shaped portion of the hinge shaft and the valley-shaped portion of the hinge cam to be in contact with each other; and
- a contact pin having a supporting pedestal which is interposed between the coil spring and the hinge cam and against which a second end of the coil spring is supported, and a pin which extends from the supporting pedestal and protrudes out of the partially opened end of the hinge housing through the through holes of the hinge shaft and the hinge cam.

8. A hinge device for a mobile communication terminal, the mobile communication terminal having a main body and a folder, the folder being pivotably and electrically connected to the main body by the hinge device, the main body and the folder each having a ground coated with a conductive material on its inner surface, said hinge device comprising:
- a conductive hinge housing electrically connected to the ground of the folder, said hinge housing adapted to be mounted within the folder;
- a conductive coil spring adapted to be mounted within the hinge housing, a first end of said coil spring being fixed to an inner wall of a first end of said hinge housing;
- a conductive contact pin adapted to be mounted within the hinge housing, a first end of said contact pin being supported by a second end of the coil spring opposite the first end of the coil spring, a second end of the contact pin extending through a second end of said hinge housing for connection to the main body; and
- a conductive hinge dummy electrically connected to the ground of the main body and adapted to be mounted within the main body, said hinge dummy being fixed to the second end of the contact pin,
wherein an electrical connection path between the main body and the folder through the hinge device includes the conductive coil spring and the conductive contact pin.

* * * * *